(12) United States Patent
Enokihara (10) Patent No.: US 11,088,358 B2
(45) Date of Patent: Aug. 10, 2021

(54) METHOD OF MANUFACTURING ELECTRODE PLATE AND DEVICE FOR MANUFACTURING ELECTRODE PLATE

(71) Applicant: TOYOTA JIDOSHA KABUSHIKI KAISHA, Toyota (JP)

(72) Inventor: Katsushi Enokihara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 16/131,142

(22) Filed: Sep. 14, 2018

(65) Prior Publication Data

US 2019/0097207 A1    Mar. 28, 2019

(30) Foreign Application Priority Data

Sep. 28, 2017  (JP) .............................. JP2017-188469

(51) Int. Cl.
*H01M 4/04* (2006.01)
*H01M 4/80* (2006.01)

(52) U.S. Cl.
CPC ......... *H01M 4/043* (2013.01); *H01M 4/0404* (2013.01); *H01M 4/0409* (2013.01); *H01M 4/80* (2013.01)

(58) Field of Classification Search
None
See application file for complete search history.

(56) References Cited

U.S. PATENT DOCUMENTS

2009/0053399 A1*  2/2009  Imamura ............. H01M 4/0404
                                                                 427/77

FOREIGN PATENT DOCUMENTS

| CN | 103191874 A | 7/2013 |
| JP | 2008-4281 A | 1/2008 |
| JP | 2015-201318 A | 11/2015 |
| JP | 2016-115416 A | 6/2016 |

OTHER PUBLICATIONS

CN103191874A—Machine translation (Year: 2013).*

* cited by examiner

*Primary Examiner* — Haroon S. Sheikh
(74) *Attorney, Agent, or Firm* — Sughrue Mion, PLLC (57) ABSTRACT

In manufacturing an electrode that is obtained by forming an active material layer on a current collector foil, a film formation process unit that forms the active material layer by layering granules obtained by granulating a powder of an active material and supplying the layered granules onto a first surface of the current collector foil, and a flattening process unit that chips off a convex portion on a surface of the active material layer that has exited the film formation process unit by a tip of a blade are used.

8 Claims, 5 Drawing Sheets

METHOD OF MANUFACTURING ELECTRODE PLATE AND DEVICE FOR MANUFACTURING ELECTRODE PLATE

INCORPORATION BY REFERENCE

The disclosure of Japanese Patent Application No. 2017-188469 filed on Sep. 28, 2017 including the specification, drawings and abstract is incorporated herein by reference in its entirety.

BACKGROUND

1. Technical Field

The disclosure relates to a method of manufacturing an electrode plate that is structured such that an active material layer is formed on a current collector foil, and a device for manufacturing the electrode plate. More specifically, the disclosure relates to a method of manufacturing an electrode plate in which granules obtained by granulating the powder of an active material are used as a raw material for forming the active material, and a device for manufacturing the electrode plate.

2. Description of Related Art

An active material layer of an electrode plate has been formed through the use of a paste obtained from the powder of an active material. In recent years, there is an art of forming the active material layer through the use of granules in a wet state that are obtained by minimizing the amount of a liquid component of the paste obtained from the powder of the active material. This art is proposed in, for example, Japanese Patent Application Publication No. 2015-201318 (JP 2015-201318 A). In the art of JP 2015-201318 A, as shown in FIG. 3 thereof, "granules 2" are supplied to a gap between "a film forming roll 11" and "a transfer roll 12". "The granules 2" turn into "a filmlike compound agent 2a" on a surface of "the transfer roll 12". "The filmlike compound agent 2a" further turns into "a compound agent layer 23" after being transferred onto "a current collector foil 21" that has been conveyed to "a back roll 13".

SUMMARY

However, in the foregoing related art, at least one minor local convex portion may be produced on a surface of the formed "compound agent layer 23". The amount of the active material per area is larger at this local convex portion than at the other spots, so the charge/discharge characteristics at this local convex portion are different, albeit locally, from the charge/discharge characteristics at the other spots. Besides, the local convex portion may cause a dent, a break or the like in the electrode plate itself, due to web handling. Thus, the local convex portion has posed an impediment to the enhancement of the quality of a battery. Besides, the local convex portion may damage facilities in downstream processes.

The local convex portion is produced because the grain size of "the granules 2" and the ratio of solid contents in "the granules 2" are not perfectly uniform. When the properties of "the granules 2" are inhomogeneous as in this case, part of the surface of "the compound agent layer 23" may assume a locally protuberant shape, at some spots. For example, when "the granules 2" that tend to be adhesive exist on "the transfer roll 12" side, the compound agent at each spot where "the granules 2" are present is raised toward "the transfer roll 12" side in passing through a gap between "the transfer roll 12" and "the back roll 13". Therefore, a local concave portion is produced at the raised spot. However, that part of the raised compound agent which cannot be carried on "the transfer roll 12" side returns to "the compound agent layer 23" side. The compound agent that has returned reaches a position adjacent to a subsequent side of the spot of the foregoing concave portion, thus constituting the local convex portion.

The disclosure provides a method of manufacturing an electrode plate and a device for manufacturing the electrode plate that eliminate a local convex portion on a surface of a formed active material layer while using granules as a main raw material of an electrode active material.

In one aspect of the disclosure, there is provided a method of manufacturing an electrode plate that is obtained by forming an active material layer on a current collector foil. This method is constituted of forming an active material layer by layering granules obtained by granulating a powder of an active material and supplying the layered granules onto a first surface of the current collector foil, as film formation, and chipping off a convex portion on a surface of the active material layer by a tip of a blade after film formation, as flattening.

In the method of manufacturing the electrode plate according to the foregoing aspect of the disclosure, the granules obtained by granulating the powder of the active material are used as the raw material of the active material layer in film formation. There may be at least one local convex portion on the active material layer thus formed on the current collector foil. However, the convex portion is chipped off by the tip of the blade in flattening, so the active material layer is flattened. Therefore, the high-quality electrode plate with no local convex portion can be manufactured.

Furthermore, in the method of manufacturing the electrode plate according to the foregoing aspect of the disclosure, a support roll that is in contact with a second surface on which the active material layer has not been formed through film formation on the current collector foil may be used in flattening, and the blade may be arranged on an active material layer side of the current collector foil on the support roll. Furthermore, a clearance D between the surface of the active material layer of the current collector foil on the support roll and the tip of the blade may be confined within a range expressed as $\delta \leq D \leq T/4$ where $\delta$ denotes a deflection amount of a surface of the support roll and T denotes a target film thickness of the active material layer. Besides, the current collector foil may be wound around the support roll. Furthermore, an angle of inclination of a surface of the blade that does not face the active material layer with respect to a normal line of the active material layer may be equal to or larger than 20° downstream in a traveling direction of the current collector foil. Besides, an angle formed by a surface of the blade that faces the active material layer with respect to a plane parallel to the surface of the active material layer may be equal to or larger than 20°.

In this manner, the following advantages are obtained. First of all, the convex portion on the active material layer is chipped off by the blade at the position where the current collector foil is supported by the support roll. Therefore, the convex portion on the active material layer can be stably chipped off with a small deflection amount of the current collector foil. Besides, since the clearance D is set within the above-mentioned range, the convex portion can be reliably chipped off as necessary, while preventing the active material layer from being damaged by the blade.

In another aspect of the disclosure, there is provided a device for manufacturing an electrode plate that is obtained by forming an active material layer on a current collector foil. This manufacturing device is equipped with a film formation process unit that is configured to form the active material layer by supplying granules obtained by granulating a powder of an active material onto a first surface of the current collector foil, and a flattening process unit that is configured to chip off a convex portion on a surface of the active material layer formed in the film formation process unit by a tip of a blade. This manufacturing device can carry out the method of manufacturing the electrode plate according to the foregoing aspect of the disclosure. In the manufacturing device according to the above-mentioned aspect of the disclosure as well, as a matter of course, the flattening process unit may have a support roll that is in contact with a second surface on which the active material layer has not been formed in the film formation process unit for the current collector foil, and the blade may be arranged on an active material layer side of the current collector foil on the support roll. Besides, a clearance between the surface of the active material layer of the current collector foil on the support roll and the tip of the blade may be confined within the aforementioned range. Furthermore, an angle of inclination of a surface of the blade that does not face the active material layer with respect to a normal line of the active material layer may be equal to or larger than 20° downstream in a traveling direction of the current collector foil. Furthermore, an angle formed by a surface of the blade that faces the active material layer with respect to a plane parallel to the surface of the active material layer may be equal to or larger than 20°.

According to the present configuration, a method of manufacturing an electrode plate and a device for manufacturing the electrode plate that eliminate a local convex portion on a surface of a formed active material layer while using granules as a main raw material of an electrode active material are provided.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENTS

Figure 1:
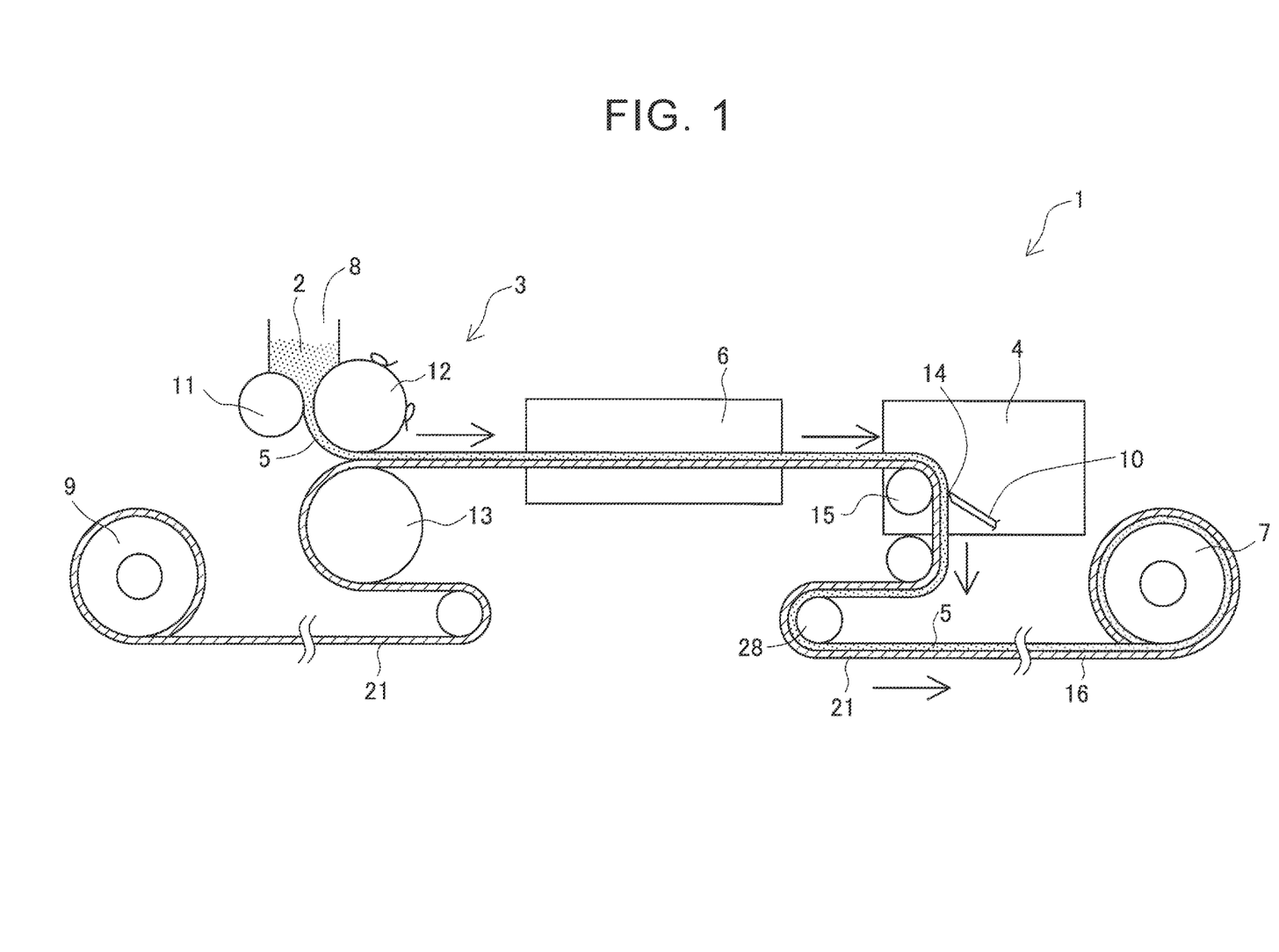
FIG. 1 is a cross-sectional view showing the configuration of a device for manufacturing an electrode plate according to the embodiment of the disclosure.

The embodiment of the disclosure as a concretization thereof will be described hereinafter in detail with reference to the accompanying drawings. The present embodiment of the disclosure is obtained by concretizing the disclosure as a device for manufacturing an electrode plate that is structured to have a current collector foil and an active material layer on a surface thereof and a method of manufacturing the electrode plate through the use of the device. FIG. 1 shows the configuration of a manufacturing device 1 according to the present embodiment of the disclosure. The manufacturing device 1 of FIG. 1 has a film formation process unit 3 and a flattening process unit 4. The film formation process unit 3 is a part that forms an active material layer 5 on a first surface of a current collector foil 21. The flattening process unit 4 is a part that flattens a surface of the active material layer 5 after film formation by chipping off a minor convex portion on the surface. In addition to these units, the manufacturing device 1 is provided with a drying furnace 6 and a winding unit 7.

The film formation process unit 3 of FIG. 1 will be described. The film formation process unit 3 has an input unit 8, a film forming roll 11, a transfer roll 12, a back roll 13, and a foil supply unit 9. The input unit 8 is a part into which granules 2 as a raw material of the active material layer 5 are input. The film formation process unit 3 is configured such that the granules 2 input into the input unit 8 are supplied to a gap between the film forming roll 11 and the transfer roll 12 from above the gap, and that the granules 2 extruded downward from the input unit 8 form the active material layer 5 on the transfer roll 12. On the other hand, the film formation process unit 3 is configured such that the current collector foil 21 is supplied to the back roll 13 from the foil supply unit 9. Thus, the active material layer 5 is transferred onto a surface (a first surface) of the current collector foil 21 from the transfer roll 12. The active material layer 5 transferred onto the current collector foil 21 is dried in the drying furnace 6.

Subsequently, the flattening process unit 4 of FIG. 1 will be described. The manufacturing device 1 is configured such that the current collector foil 21 on which the active material layer 5 is formed in the film formation process unit 3 enters the flattening process unit 4. Furthermore, the current collector foil 21 and the active material layer 5 enter the flattening process unit 4 after having passed through the drying furnace 6. The flattening process unit 4 is provided with a blade 10. The blade 10 is arranged such that a tip 14 thereof is substantially in contact with a surface of the active material layer 5. Besides, a root of the blade 10 is positioned downstream of the tip 14 thereof in a flow direction of the current collector foil 21. The blade 10 serves to chip off at least one local convex portion that may exist on the surface of the active material layer 5 on the current collector foil 21.

Besides, in the manufacturing device 1 of FIG. 1, a support roll 15 is provided downstream of the drying furnace 6. The current collector foil 21 that has exited the drying furnace 6 is wound around the support roll 15 such that the active material layer 5 is directed outward. That is, the support roll 15 is in contact with a back surface (a second surface) of the current collector foil 21 on which the active material layer 5 has not been formed in the film formation process unit 3. Also, the flattening process unit 4 is arranged at a spot of the manufacturing device 1 where the support roll 15 is provided. That is, the blade 10 flattens the active material layer 5 at a position where the current collector foil 21 is supported by the support roll 15.

In the manufacturing device 1, the support roll 15 is positioned downstream of the drying furnace 6 and upstream of an auxiliary roll 28 in the flow direction of the current collector foil 21. The auxiliary roll 28 is a member into which the active material layer 5 first comes into contact after the current collector foil 21 and the active material layer 5 exit the film formation process unit 3. The current collector foil 21, namely, the electrode plate 16 on which the active material layer 5 has been flattened in the flattening process unit 4 is wound by the winding unit 7 and recovered.

Figure 2:
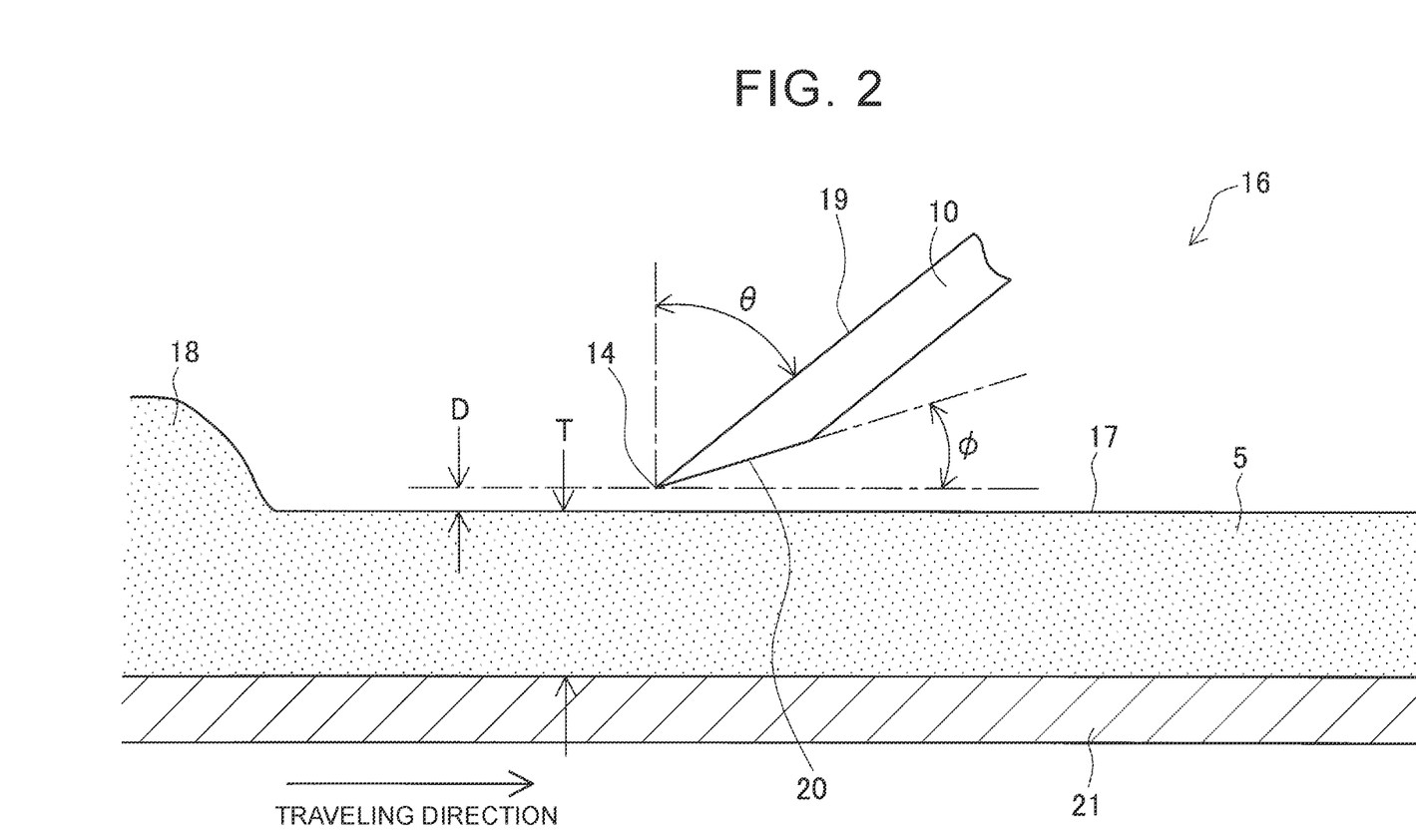
FIG. 2 is a cross-sectional view illustrating various parameters regarding a blade of a flattening process unit.

The flattening process unit 4 will be described in more detail with reference to FIG. 2. FIG. 2 is a cross-sectional view showing a relationship between the tip 14 of the blade 10 and a surface 17 of the active material layer 5. Incidentally, although the current collector foil 21 and the active material layer 5 are shown rectilinearly in FIG. 2, the electrode plate 16 is curved on the support roll 15 such that the active material layer 5 is directed outward as shown in FIG. 1 in the actual flattening process unit 4. As shown in FIG. 2, there are three parameters indicating the relationship between the tip 14 of the blade 10 and the surface 17 of the active material layer 5. These parameters are a clearance D, a rake angle $\theta$, and a relief angle $\phi$.

The clearance D is the most important among these three parameters. The clearance D is a distance between the tip 14 of the blade 10 and the surface 17 of the active material layer 5 (however, at a spot where there is no local convex portion 18) in the direction of a normal line of the surface 17. When the clearance D is too large, the convex portion 18 cannot be chipped off. On the other hand, the height of the surface 17 of the active material layer 5 is not perfectly constant even at the spot where there is no convex portion 18, due to factors such as a slight eccentricity and the like of the support roll 15. In consequence, the clearance D is preferably confined within a certain range instead of being set as small as possible.

A lower limit of the preferable range of the clearance D corresponds to a deflection amount of the surface of the support roll 15. The deflection amount means a difference between maximum and minimum radii of the support roll 15 resulting from the eccentricity of the support roll 15. When the clearance D is smaller than the deflection amount, the blade 10 may chip off the active material layer 5 even at the spot where there is no convex portion 18. This has the opposite effect of damaging the active material layer 5. Alternatively, the blade 10 may be damaged instead. On the other hand, an upper limit of the preferable range is determined in accordance with the permissible height of the convex portion 18 that is not chipped off, that is, the permissible height of a trapezoid remaining as a trace after chipping off the convex portion 18. For example, when the permissible limit is defined as a quarter of a target value of a film thickness T of the active material layer 5, the value (T/4) is the upper limit of the preferable range of the clearance D. In this case, the preferable range of the clearance D is expressed by the following expression: $\delta \leq D \leq T/4$ ($\delta$ denotes the foregoing deflection amount).

Next, the rake angle $\theta$ will be described. This rake angle $\theta$ is an angle of inclination of a front surface (a surface that does not face the active material layer 5) 19 of the blade 10 with respect to a normal line of the active material layer 5 downstream in the traveling direction of the current collector foil 21. When this rake angle $\theta$ is too small (i.e., when the blade 10 rises too steeply with respect to the surface 17 of the active material layer 5) or is a negative value (i.e., when the front surface 19 of the blade 10 is inclined with respect to the normal line of the active material layer 5 upstream in the traveling direction of the current collector foil 21 (i.e., reversely inclined)), the convex portion 18 cannot be chipped off. Therefore, the rake angle $\theta$ is desired to be equal to or larger than 20°. Although there is no upper limit of the rake angle $\theta$ in particular (however, the rake angle $\theta$ cannot be set equal to or larger than 90° in the first place), the rake angle $\theta$ is substantially restricted by a lower limit of the relief angle $\phi$, which will be described subsequently.

The relief angle $\phi$ is an angle that is formed by a back surface (a surface that faces the active material layer 5) 20 of the blade 10 with respect to a plane parallel to the surface 17 of the active material layer 5. In FIG. 1, the plane parallel to the surface 17 is a plane parallel to a contact plane of the surface 17 at a position closest to the tip 14. When this relief angle $\phi$ is too small, the surface 17 of the active material layer 5 that has just passed the tip 14 may graze the back surface 20, depending on the situation of deflection or the like of the support roll 15. As a result, the active material layer 5 is damaged. Therefore, the relief angle $\phi$ is desired to be equal to or larger than 20°. Although there is no upper limit of the relief angle $\phi$ in particular either, the relief angle $\phi$ is substantially restricted by a lower limit of the foregoing rake angle $\theta$.

Figure 3:
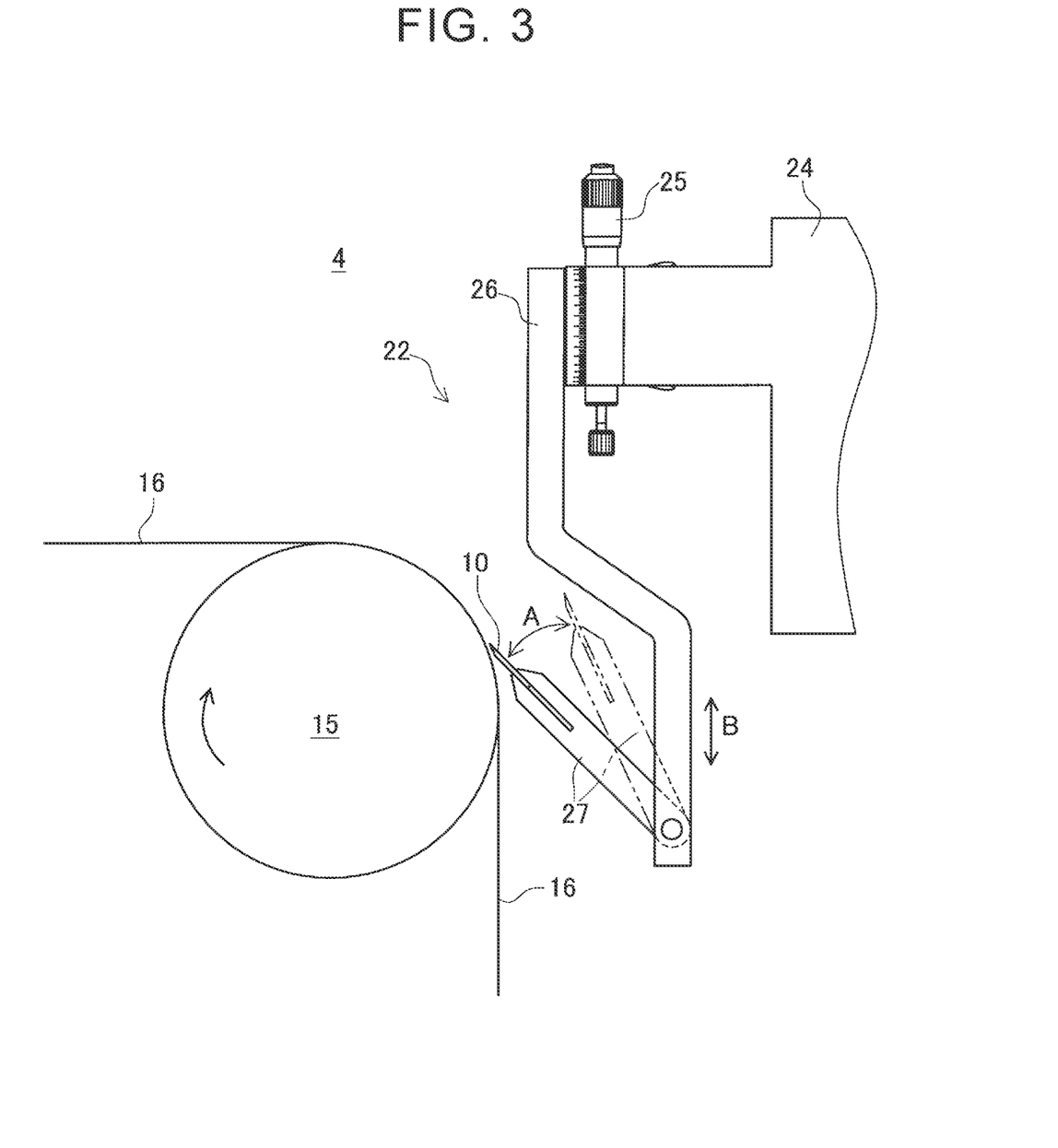
FIG. 3 is a lateral view showing a mechanism for adjusting the clearance of the blade.

Subsequently, an adjustment mechanism for adjusting the aforementioned parameters of the blade 10 will be described with reference to FIG. 3. As shown in FIG. 3, the flattening process unit 4 is provided with a holding mechanism 22 for the blade 10. The holding mechanism 22 has a fixed frame 24 that is provided with a holding arm 26 via a micrometer 25. The position of the holding arm 26 can be adjusted in a vertical direction, through the operation of the micrometer 25. Also, a blade holder 27 is attached to the holding arm 26 in a swingable manner. The blade 10 is securely attached to the blade holder 27 and can swing with respect to the holding arm 26 integrally with the blade holder 27 (as indicated by an arrow A).

In the holding mechanism 22 of FIG. 3, the aforementioned three parameters can be appropriately adjusted by adjusting the height of the holding arm 26 (as indicated by an arrow B) and adjusting the angle of the blade holder 27 (as indicated by the arrow A). The clearance D is adjusted mainly by adjusting the angle as indicated by the arrow A. Although the rake angle $\theta$ and the relief angle $\phi$ also change through the adjustment of the angle as indicated by the arrow A, the amount itself of adjustment of the angle for adjusting the clearance D is usually very small, so the changes in the rake angle $\theta$ and the relief angle $\theta$ are confined within a substantially negligible range.

The manufacturing device 1 according to the present embodiment of the disclosure configured as described above manufactures the electrode plate 16 as follows. The manufacture of the electrode plate 16 by the manufacturing device 1 is broadly constituted of a film formation process and a flattening process. The film formation process unit 3 carries out the film formation process, and the flattening process unit 4 carries out the flattening process.

In the film formation process, the granules 2 are input into the input unit 8 of the film formation process unit 3. The granules 2 used in the present embodiment of the disclosure may or may not be "a molded product" mentioned in JP 2015-201318 A (see [0013] of JP 2015-201318 A). The input granules 2 pass through the gap between the film forming roll 11 and the transfer roll 12, turn into the layered active material layer 5, and are conveyed while being carried on the transfer roll 12. On the other hand, the current collector foil 21 is supplied to the back roll 13 from the foil supply unit 9. Therefore, the active material layer 5 is transferred onto the current collector foil 21 from the transfer roll 12. Thus, there is obtained a state where the active material layer 5 is formed on the surface of the current collector foil 21. In this state, the active material layer 5 may have many spots where the foregoing local convex portion 18 exists. This current collector foil 21 and this active material layer 5 are sent to the flattening process unit 4 via the drying furnace 6. In the drying furnace 6, a liquid component of the active material layer 5 is removed.

In the subsequent flattening process, the blade 10 of the flattening process unit 4 chips off the convex portion 18. Thus, the convex portion 18 on the surface 17 of the active material layer 5 is removed, and the surface 17 of the active material layer 5 is flattened. As described previously, the operation of chipping off the convex portion 18 by this blade 10 is performed at a position where the support roll 15 supports the current collector foil 21. Therefore, the current collector foil 21 and the active material layer 5 do not widely deflect beyond the deflection amount 8 of the support roll 15 at the spot where the operation of chipping off the convex portion 18 is performed by the blade 10. Accordingly, the operation of chipping off the convex portion 18 is stably performed. Incidentally, the foregoing parameters of the blade 10, especially the clearance D, are appropriately adjusted in advance in accordance with the film thicknesses of the current collector foil 21 and the active material layer 5, through the adjustment function of the holding mechanism 22 shown in FIG. 3.

Incidentally, until the current collector foil 21 and the active material layer 5 reach the flattening process unit 4 after exiting the film formation process unit 3, the active material layer 5 is not in contact with any member of the manufacturing device 1 of FIG. 1. Therefore, the convex portion 18 that has not been chipped off by the blade 10 in the flattening process unit 4 does not damage any part of the manufacturing device 1. Besides, the active material layer 5 first comes into contact with the auxiliary roll 28 after exiting the film formation process unit 3. At that moment, however, the active material layer 5 has already been flattened by the flattening process unit 4. Therefore, the convex portion 18 does not damage the auxiliary roll 28 either. The same holds true for all the members of the manufacturing device 1 downstream of the auxiliary roll 28.

The electrode plate 16 with the surface 17 of the active material layer 5 thus flattened by the flattening process unit 4 is wound by the winding unit 7. After that, the electrode plate 16 is provided for downstream processes such as a process of further formation of the active material layer 5 on the back surface of the electrode plate 16, a pressing process, a slitting process and the like. Alternatively, a process unit for the downstream processes such as the pressing process, the slitting process and the like may be provided instead of the winding unit 7, in the configuration of the entire device of FIG. 1. In this case, after being flattened, the electrode plate 16 is directly delivered to the downstream processes instead of being temporarily wound.

Figure 4:
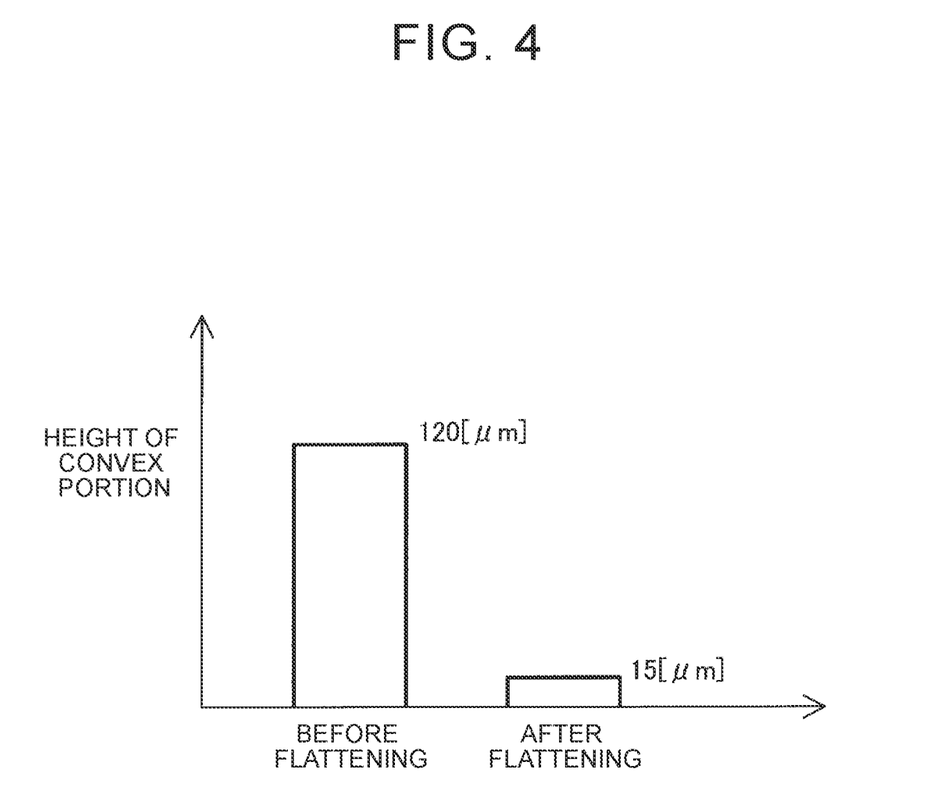
FIG. 4 is a graph making a comparison between maximum heights of a convex portion of an active material layer before and after a flattening process.

Subsequently, the effect obtained by the present embodiment of the disclosure will be described. FIG. 4 is a graph making a comparison between heights of the convex portion that exists on the surface 17 of the active material layer 5, before and after passage through the flattening process unit 4. The graph of FIG. 4 indicates the maximum height of a convexity that exists on the surface 17 of the active material layer 5, as measured when the current collector foil 21 and the active material layer 5 with a length of 100 m are continuously output from the film formation process unit 3 and passed through the flattening process unit 4. As a matter of course, the height before passage through the flattening process unit 4 is the height of the foregoing convex portion 18. The height after passage through the flattening process unit 4 is the height of the trapezoid remaining after the chipping off of the convex portion 18 by the blade 10. As shown in FIG. 4, the height of the convexity existing on the surface 17 of the active material layer 5 after flattening is reduced to about one-eighth of the height of the convexity existing on the surface 17 of the active material layer 5 before flattening.

Figure 5:
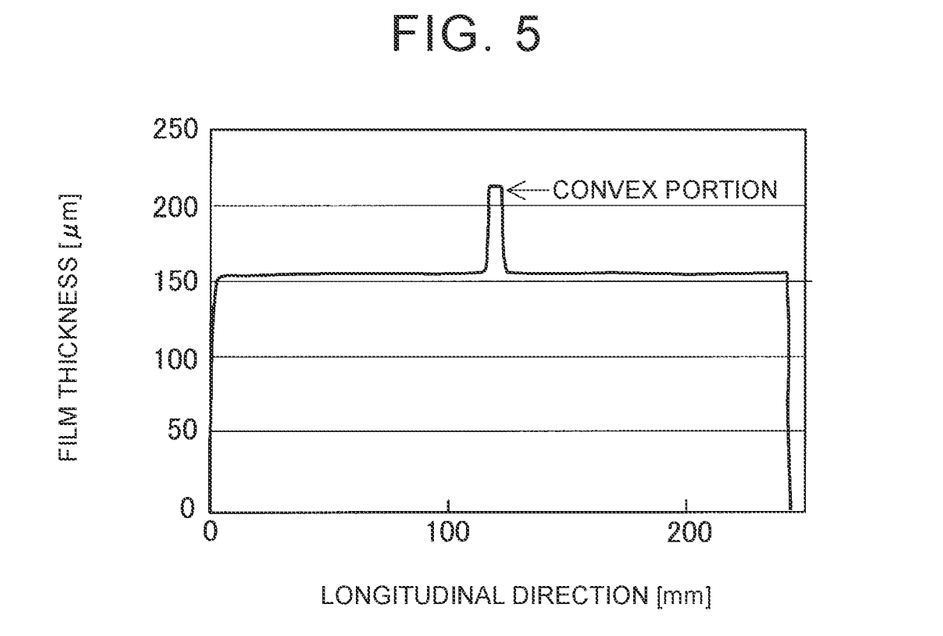
FIG. 5 is a graph showing an exemplary film thickness profile in a longitudinal direction of the active material layer at a spot corresponding to the convex portion.
Figure 6:
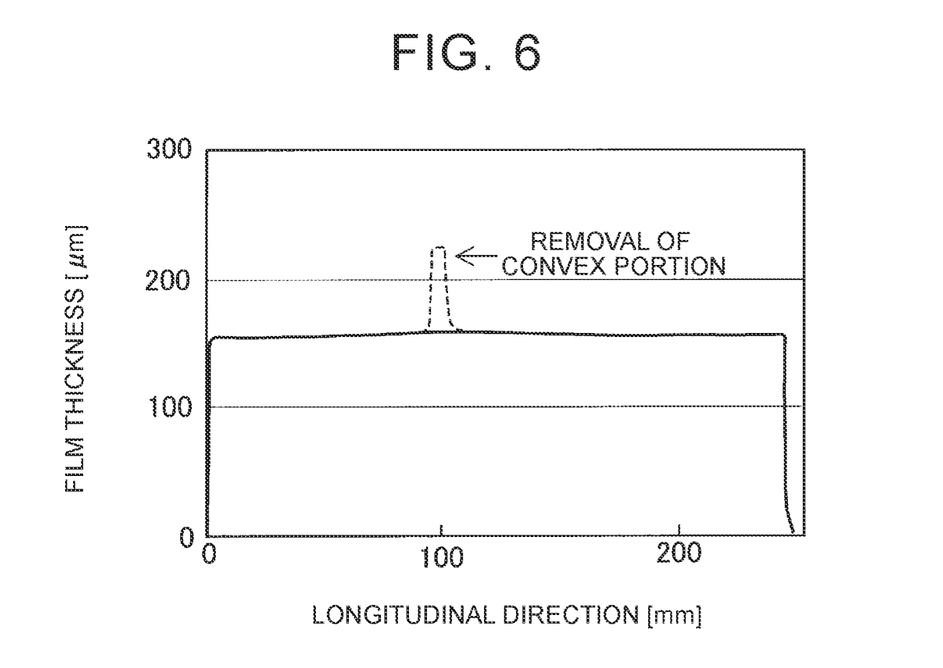
FIG. 6 is a graph showing an exemplary film thickness profile in the longitudinal direction of the active material layer after chipping off the convex portion.

FIGS. 5 and 6 show exemplary film thickness profiles in the longitudinal direction of the active material layer 5 at the spot corresponding to the convex portion 18. FIG. 5 shows the profile measured at the spot where the convex portion 18 actually exists before flattening. FIG. 6 shows the profile measured at the spot where the convex portion 18 has been chipped off after flattening. A spike with a height of about 70 µm resulting from the convex portion 18 is visible on the graph before flattening as shown in FIG. 5, whereas no profile similar to the convex portion is recognized on the graph after flattening as shown in FIG. 6. Incidentally, FIGS. 4 and 6 are based on a measurement result obtained by a common film thickness meter called an RC meter.

As described above in detail, according to the present embodiment of the disclosure, the convex portion 18 is chipped off from the active material layer 5 by the blade 10 in the flattening process unit 4, when the active material layer 5 and the current collector foil 21 exit the film formation process unit 3 after being formed based on the granules 2. Thus, the manufacturing device 1 and manufacturing method for manufacturing the electrode plate 16 with the flat surface 17 of the active material layer 5 while using the granules 2 as the main raw material of the electrode active material are realized. It is thus possible to contribute toward enhancing the quality of a battery and preventing facilities in posterior processes from being damaged. Incidentally, in the present embodiment of the disclosure, at least one local concave portion in the active material layer 5 cannot be eliminated, but no problem arises therefrom. This is because no major problem is caused as far as the quality of the battery is concerned, except that the charge/discharge performance of the battery is undeniably lower at the local concave portion of the active material layer 5 than at the other spots. This holds true especially for the case of a positive electrode.

Besides, in the present embodiment of the disclosure, the facilities are prevented from being damaged by the convex portion 18, by providing the flattening process unit 4 at a position upstream of the auxiliary roll 28. Besides, in the present embodiment of the disclosure, the current collector foil 21 is restrained from deflecting and the convex portion 18 is stably chipped off, by providing the flattening process unit 4 on the support roll 15. Besides, the convex portion 18 can be more reliably chipped off as necessary while preventing the active material layer 5 from being damaged by the blade 10, by appropriately adjusting the parameters regarding the arrangement of the blade 10, especially the clearance D.

Incidentally, the present embodiment of the disclosure is nothing more than an exemplification and does not limit the disclosure at all. Accordingly, the disclosure can be subjected to various improvements and modifications within such a range as not to depart from the gist thereof, as a matter of course. For example, the concrete powder component and liquid component constituting the granules 2 may be appropriately selected in accordance with the type of the electrode plate to be manufactured. The same holds true for the material of the current collector foil 21. Besides, the three rolls in the film formation process unit 3 may not necessarily be arranged as shown in FIG. 1, but may be arranged as described in JP 2015-201318 A. Besides, the drying furnace 6 is not required when the amount of the liquid component in the granules 2 is extremely small.

What is claimed is:

1. A method of manufacturing an electrode plate that is obtained by forming an active material layer on a current collector foil, comprising:

forming an active material layer by layering granules in a wet state, wherein the granules are obtained by granulating a powder of an active material, and continuously supplying the layered granules in the wet state onto a first surface of the current collector foil, as film formation; and chipping off a convex portion on a surface of the active material layer by a tip of a blade after the film formation, as flattening, wherein a front surface of the blade faces away from the surface of the active material layer and has a rake angle θ equal to or larger than 20° with respect to a normal line of the active material layer downstream in a traveling direction of the current collector foil.

2. The method of manufacturing the electrode plate according to claim 1, wherein a support roll that is in contact with a second surface on which the active material layer has not been formed through the film formation on the current collector foil is used in the flattening, and the blade is arranged on an active material layer side of the current collector foil on the support roll.

3. The method of manufacturing the electrode plate according to claim 2, wherein a clearance D between the surface of the active material layer of the current collector foil on the support roll and the tip of the blade is confined within a range expressed as δ≤D≤T/4 where δ denotes a deflection amount of a surface of the support roll and T denotes a target film thickness of the active material layer.

4. The method of manufacturing the electrode plate according to claim 1, wherein an angle formed by a surface of the blade that faces the active material layer with respect to a plane parallel to the surface of the active material layer is equal to or larger than 20°.

5. A device for manufacturing an electrode plate that is obtained by forming an active material layer on a current collector foil, comprising:

a film formation process unit that is configured to form the active material layer by continuously supplying granules in a wet state, wherein the granules are obtained by granulating a powder of an active material, onto a first surface of the current collector foil; and a flattening process unit that is configured to chip off a convex portion on a surface of the active material layer formed in the film formation process unit by a tip of a blade, wherein a front surface of the blade faces away from the surface of the active material layer and has a rake angle θ equal to or larger than 20° with respect to a normal line of the active material layer downstream in a traveling direction of the current collector foil.

6. The device for manufacturing the electrode plate according to claim 5, wherein the flattening process unit has a support roll that is in contact with a second surface on which the active material layer has not been formed in the film formation process unit for the current collector foil, and the blade is arranged on an active material layer side of the current collector foil on the support roll.

7. The device for manufacturing the electrode plate according to claim 6, wherein a clearance D between the surface of the active material layer of the current collector foil on the support roll and the tip of the blade is confined within a range expressed as δ≤D≤T/4 where δ denotes a deflection amount of a surface of the support roll and T denotes a target film thickness of the active material layer.

8. The device for manufacturing the electrode plate according to claim 5, wherein an angle formed by a surface of the blade that faces the active material layer with respect to a plane parallel to the surface of the active material layer is equal to or larger than 20°.

* * * * *